(12) United States Patent
Oziomek et al.

(10) Patent No.: US 7,671,139 B1
(45) Date of Patent: Mar. 2, 2010

(54) FUNCTIONALIZED POLYMERS AND TIRES MADE THEREFROM

(75) Inventors: James Oziomek, Cuyahoga Falls, OH (US); James Hall, Mogadore, OH (US); Thomas Antkowiak, Rittman, OH (US)

(73) Assignee: Bridgestone Corporation (JP)

( * ) Notice: Subject to any disclaimer, the term of this patent is extended or adjusted under 35 U.S.C. 154(b) by 977 days.

(21) Appl. No.: 11/156,301

(22) Filed: Jun. 17, 2005

Related U.S. Application Data

(60) Provisional application No. 60/581,289, filed on Jun. 18, 2004.

(51) Int. Cl.
C08F 8/06 (2006.01)
C08F 8/32 (2006.01)
C08C 19/04 (2006.01)
C08C 19/22 (2006.01)

(52) U.S. Cl. .................. 525/383; 525/379; 525/384; 525/386; 525/331.9; 525/332.8; 525/332.9; 525/333.1; 525/333.2

(58) Field of Classification Search .................. 525/379, 525/383, 384, 386, 331.9, 332.8, 332.9, 333.1, 525/333.2
See application file for complete search history.

(56) References Cited

U.S. PATENT DOCUMENTS

| | | | | |
|---|---|---|---|---|
| 3,853,815 A * | 12/1974 | Lubowitz | .................. | 528/109 |
| 4,253,513 A * | 3/1981 | Larson et al. | .................. | 152/452 |
| 4,429,091 A | 1/1984 | Hall | .................. | 526/181 |
| 4,835,220 A | 5/1989 | Bronstert et al. | .................. | 525/250 |
| 5,227,425 A | 7/1993 | Rauline | .................. | 524/493 |
| 5,268,439 A | 12/1993 | Hergenrother et al. | .................. | 526/340 |
| 5,329,005 A | 7/1994 | Lawson et al. | .................. | 540/450 |
| 5,332,810 A | 7/1994 | Lawson et al. | .................. | 540/450 |
| 5,393,721 A | 2/1995 | Kitamura et al. | .................. | 502/154 |
| 5,491,230 A | 2/1996 | Lawson et al. | .................. | 540/450 |
| 5,496,940 A | 3/1996 | Lawson et al. | .................. | 540/450 |
| 5,514,753 A | 5/1996 | Ozawa et al. | .................. | 525/279 |
| 5,521,309 A | 5/1996 | Antkowiak et al. | .................. | 540/612 |
| 5,574,109 A | 11/1996 | Lawson et al. | .................. | 525/280 |
| 5,578,542 A | 11/1996 | Lawson et al. | .................. | 502/167 |
| 5,698,646 A | 12/1997 | Kitamura et al. | .................. | 526/174 |
| 5,717,022 A | 2/1998 | Beckmann et al. | .................. | 524/493 |
| 5,719,207 A | 2/1998 | Cohen et al. | .................. | 524/213 |
| 5,786,441 A | 7/1998 | Lawson et al. | .................. | 528/229 |
| 5,786,448 A | 7/1998 | Nefzi et al. | .................. | 530/317 |
| 5,866,171 A | 2/1999 | Kata | .................. | 425/46 |
| 5,876,527 A | 3/1999 | Tsuruta et al. | .................. | 152/541 |
| 5,931,211 A | 8/1999 | Tamura | .................. | 152/209.5 |
| 5,971,046 A | 10/1999 | Koch et al. | .................. | 152/152.1 |
| 6,025,450 A | 2/2000 | Lawson et al. | .................. | 526/340 |
| 6,046,288 A | 4/2000 | Lawson et al. | .................. | 526/175 |
| 6,080,853 A | 6/2000 | Corrigan et al. | .................. | 536/119 |
| 6,103,846 A | 8/2000 | Willis et al. | .................. | 126/335 |
| 6,242,538 B1 | 6/2001 | Bening et al. | .................. | 525/338 |
| 6,391,981 B1 | 5/2002 | Willis et al. | .................. | 122/485 |
| 6,492,469 B2 | 12/2002 | Willis et al. | .................. | 525/366 |
| 2003/0203989 A1 * | 10/2003 | Rao et al. | .................. | 523/200 |

FOREIGN PATENT DOCUMENTS

WO WO 2004/041840 5/2004

OTHER PUBLICATIONS

Wikipedia arrticle "Polyurethane," http://en.wikipedia.org/wiki/Polyurethane, retrieved Feb. 2, 2008.*

* cited by examiner

*Primary Examiner*—Roberto Rábago
(74) *Attorney, Agent, or Firm*—Meredith E. Hooker; Arthur Reginelli

(57) ABSTRACT

A functionalized polymer defined by the formula

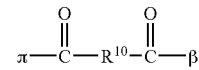

where π is a polymer chain, $R^{10}$ is a divalent organic group, and β is a hydroxyl group, an alkoxyl group, or an amine group, where the amine group can be represented by the formula $-NR_2$, where at least one R is a monovalent organic group and where the second R is hydrogen or a monovalent organic group, and where the alkoxyl group can be represented by the formula —OR', where R' is a monovalent organic group.

25 Claims, No Drawings

US 7,671,139 B1

FUNCTIONALIZED POLYMERS AND TIRES MADE THEREFROM

This application claims the benefit of U.S. Provisional Application No. 60/581,289, filed Jun. 18, 2004.

FIELD OF THE INVENTION

This invention relates to functionalized polymers and rubber vulcanizates prepared therefrom.

BACKGROUND OF THE INVENTION

In the art of making tires, it is desirable to employ rubber vulcanizates that demonstrate reduced hysteresis loss, i.e., less loss of mechanical energy to heat. Hysteresis loss is often attributed to polymer free ends within the cross-linked rubber network, as well as the disassociation of filler agglomerates. The degree of dispersion of filler within the vulcanizate is also important, as increased dispersion provides better wear resistance.

Functionalized polymers have been employed to reduce hysteresis loss and increase bound rubber. The functional group of the functionalized polymer is believed to reduce the number of polymer free ends by interacting or reacting with filler particles. Also, the interaction between the functional group and the filler particles reduces filler agglomeration, which thereby reduces hysteretic losses attributable to the disassociation of filler agglomerates (i.e., Payne effect).

Conjugated diene monomers are often anionically polymerized by using alkyllithium compounds as initiators. Selection of certain alkyllithium compounds can provide a polymer product having functionality at the head of the polymer chain. A functional group can also be attached to the tail end of an anionically-polymerized polymer by terminating a living polymer with a functionalized compound.

For example, trialkyltin chlorides, such as tributyl tin chloride, have been employed to terminate the polymerization of conjugated dienes, as well as the copolymerization of conjugated dienes and vinyl aromatic monomers, to produce polymers having a trialkyltin functionality at the tail end of the polymer. These polymers have proven to be technologically useful in the manufacture of tire treads that are characterized by improved traction, low rolling resistance, and improved wear.

Because functionalized polymers are advantageous, especially in the preparation of tire compositions, there exists a need for additional functionalized polymers. Moreover, because precipitated silica has been increasingly used as reinforcing particulate filler in tires, functionalized elastomers having affinity to silica filler are needed.

SUMMARY OF THE INVENTION

The present invention provides A functionalized polymer defined by the formula

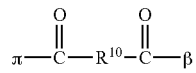

where π is a polymer chain, $R^{10}$ is a divalent organic group, and β is a hydroxyl group, an alkoxyl group, or an amine group, where the amine group can be represented by the formula —$NR_2$, where at least one R is a monovalent organic group and where the second R is hydrogen or a monovalent organic group, and where the alkoxyl group can be represented by the formula —OR', where R' is a monovalent organic group.

A method of forming a functionalized polymer, the method comprising:
contacting a living polymer with a terminating agent defined by the formula IX

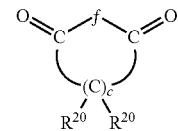

where ƒ is an oxygen atom or —N(R)—, where R is a monovalent organic group that is devoid of acidic hydrogens, each $R^{20}$ is independently hydrogen a monovalent organic group, or two $R^{20}$ join to form a hydrocarbylene group that results in a bicyclic structure, and c is an integer from 2 to about 6.aa

DETAILED DESCRIPTION OF ILLUSTRATIVE EMBODIMENTS

This invention relates to functionalized polymers defined by the Formula I

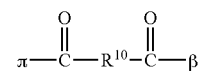

where π is a polymer chain, $R^{10}$ is a divalent organic group, and β is a hydroxyl group, an alkoxyl group, or an amine group, where the amine group can be represented by the formula —$NR_2$, where at least one R is a monovalent organic group and where the second R is hydrogen or a monovalent organic group, and where the alkoxyl group can be represented by the formula —OR', where R' is a monovalent organic group.

The polymer chain (π) preferably includes a rubbery polymer chain. More preferably, the polymer chain substituent is a polymer that has a glass transition temperature (Tg) that is less than 0° C., more preferably less than –20° C., and even more preferably less than –30° C.

Preferred polymers include anionically polymerized polymers. More specifically, preferred polymers include polybutadiene, polyisoprene, poly(styrene-co-butadiene), poly(styrene-co-butadiene-co-isoprene), poly(isoprene-co-styrene), and poly(butadiene-co-isoprene).

The polymer preferably has a number average molecular weight ($M_n$) of from about 5 to about 1,000 kg/mole, preferably from about 50 to about 500 kg/mole, and more preferably 100 to about 300 kg/mole, as measured by using Gel Permeation Chromatography (GPC) calibrated with polystyrene standards and adjusted for the Mark-Houwink constants for the polymer in question.

Monovalent organic groups preferably include hydrocarbyl or substituted hydrocarbyl groups such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. Preferably, the hydrocarbyl groups include from 1 carbon atom (or the appropriate minimum number of carbon atoms) to form the group, up to 20 carbon atoms, and preferably from about 1 to about 8 carbon atoms. These hydrocarbyl groups may contain heteroatoms such as, but not limited to, nitrogen, oxygen, silicon, sulfur, and phosphorus atoms.

Divalent organic groups preferably include hydrocarbylene groups or substituted hydrocarbylene groups such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. Substituted hydrocarbylene groups include those hydrocarbylene groups in which one or more hydrogen atoms have been replaced by a substituent such as an alkyl group. The divalent organic group may also contain one or more heteroatoms such as, but not limited to, nitrogen, oxygen, silicon, sulfur, and phosphorus atoms.

In one embodiment, $R^{10}$ is a substituted ethylene group that can be defined by the formula II

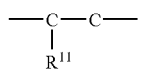

where $R^{11}$ is a monovalent organic group. Preferably, $R^{11}$ is an alkyl or alkenyl group that includes at least 3 carbon atoms, preferably at least 4 carbon atoms, and more preferably at least 5 carbon atoms, with the most preferred range being from about 4 to about 20 carbon atoms.

In one embodiment, the substituent β is a hydroxy or alkoxy group, which forms an acid or ester functionality. These polymers can be defined by the formula III

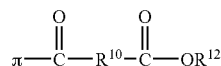

where π is a polymer, $R^{10}$ is a divalent organic group and $R^{12}$ is a monovalent organic group or a hydrogen atom.

In one embodiment, the substituent β is an amine, which forms a polymer that has a primary or secondary amine functionality. These polymers can be defined by the formula IV

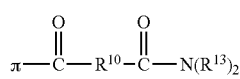

where π is a polymer, $R^{10}$ is a divalent organic group, where at least one $R^{13}$ is a monovalent organic group, and where the second $R^{13}$ is hydrogen or a monovalent organic group.

In one particular embodiment, at least one $R^{13}$ includes a hydrocarbyl group that includes an amine functionality within the hydrocarbyl group. As an example, the functionalized polymer of this embodiment can be defined by the formula V

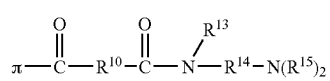

where π is a polymer, $R^{10}$ is a divalent organic group, $R^{13}$ is a hydrogen atom or a monovalent organic group, $R^{14}$ is a divalent organic group, and each $R^{15}$ is a monovalent organic group. The organic group $R^{15}$ preferably does not include any substituent or hetero atom that includes an acidic hydrogen such as a primary or secondary amine or a hydroxyl or acid group.

In one embodiment, the functionalized polymer includes functional groups at both the head and the tail of the polymer. This functionalized polymer can be defined by the formula VI

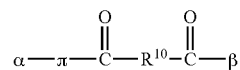

where α is a functionality or functional group that reacts or interacts with rubber or rubber fillers or otherwise has a desirable impact on filled rubber compositions or vulcanizates, π is a polymer chain, $R^{10}$ is a divalent organic group, and β a hydroxyl, alkoxyl, or amine group as defined above.

Those groups or substituents that react or interact with rubber or rubber fillers or otherwise have a desirable impact on filler rubber compositions or vulcanizates are known and may include trialkyl tin substituents or cyclic amine groups. Exemplary trialkyl tin substituents are disclosed in U.S. Pat. No. 5,268,439, which is incorporated herein by reference. Exemplary cyclic amine groups are disclosed in U.S. Pat. Nos. 6,080,853, 5,786,448, 6,025,450, and 6,046,288, which are incorporated herein by reference. In another embodiment, α includes a thioacetal as described in WO/2004041870, which is incorporated herein by reference.

In one embodiment, the functionality α includes a cyclic amine that can be represented by the formula VII

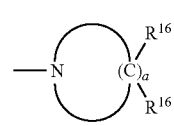

where each $R^{16}$ is independently hydrogen or a hydrocarbyl group, or where two $R^{16}$ join together to form a hydrocarbylene group, which results in a bicyclic compound, and where a is an integer from 4 to about 18. The substituents of formula VII can include multi-cyclo substituents such as tricyclo substituents.

Specific examples of cyclic amine groups include -pyrrolidine, -3-methypyrrolidine, -3,4-dimethylpyrrolidine, -3,3-dimethylpyrrolidine, -piperidine, -4-methylpiperidine, -3-methylpiperidine, -morpholine, -4-methylpiperazine, -4-ethyl-piperazine, -4-propylpiperazine, -hexamethyleneimine (or -perhydroazepine), -trimethylperhydroazepine, -azacyclotridecane, -azacyclohexadecane, -azacycloheptadecene, -trimethylazabicyclooctane, -perhydroisoquinoline, and -perhydroindole.

In another embodiment, the functionality α can include a side-chain cyclic amino group that can be represented by the formula VIII

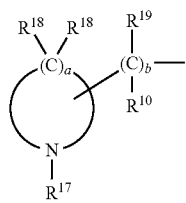

where each $R^{17}$, $R^{18}$, and $R^{19}$ are independently hydrogen or monovalent organic groups, or two $R^{18}$ groups may form a hydrocarbylene group that results in a bicyclic structure, a is an integer from about 4 to about 18, and b is an integer from 0 to about 12.

Specific examples of side-chain amino groups include 2-(2-oethyl)-1-methylpyrrolidine, 3-(omethyl)-1-methylpiperidino, 3-quinuclidino, as well as pyrrolidino derivatives, piperidino derivatives, azabicyclooctano derivatives, azabicyclononano derivative, tetrahydroazepino derivatives, and an azatridecano derivative. Other examples include various di-N-alkyl derivatives of piperazine (1,4-diazacyclohexane) and of di-N-alkylhomopiperazine (1,4-diazacycloheptanes), as well as di-N-alkyl derivatives of 1,4-, 1,5-diazacyclooctanes, and ring C-substituted di-N-alkyl derivatives of 1,4-, or 1,5-diazacyclooctanes.

The functionalized polymers of this invention are preferably prepared by reacting or terminating a living polymer with a functionalizing or terminating agent that includes an imide or cyclic anhydride functionality. Preferred terminating agents can be defined by the formula IX

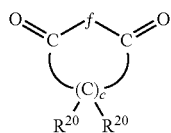

where $f$ is an oxygen atom or —N(R)—, where R is a or monovalent organic group, each $R^{20}$ is independently hydrogen a monovalent organic group, or two $R^{20}$ join to form a hydrocarbylene group that results in a bicyclic structure, and c is an integer from 2 to about 6. R, which is the monovalent organic group attached to the nitrogen atom, preferably does not include any substituent or heteroatom that includes an acidic hydrogen such as a primary or secondary amine or a hydroxyl or acid group. As those skilled in the art will appreciate, these groups will react with the carbanion of a living polymer and possibly result in erratic terminal groups.

Where $f$ is an oxygen atom, preferred classes of the terminating agents include succinic anhydrides, phthalic anhydrides, maleic anhydrides, and mixtures thereof.

The anhydride compounds can be prepared by cyclic dehydration of dicarboxylic acids. Also, these anhydrides can be commercially obtained from a variety of sources. For example, anhydrides are available under from Rutherford Chemicals Specialties; Bayonne, N.J.

Where $f$ is an amine (i.e., —N(R)—), useful types of terminating agents include succinimides and phthalimides.

The imide compounds can be prepared by azeotropically distilling water from a mixture of an anhydride and an amine within an appropriate solvent. Also, these imides can be obtained from a variety of sources. For example, imides are available from Pentagon Chemical Specialties, Ltd.; Workington, Calif.

In certain embodiments, the functionalizing agent includes a "tail" that is formed by a long-chain organic group at substituent $R^{20}$. This monovalent organic group is preferably a hydrocarbyl group including from about 3 to about 20, preferably from about 4 to about 16, and even more preferably from about 5 to about 12, carbon atoms.

Specific examples of anhydride functionalizing agents that include a "tail" include dodecenyl succinic anhydride, octenyl succinic anhydride, hexadecenyl succinic anhydride, and polyisobutenyl succinic anhydride.

Specific examples of amines include 3-dodecenyl-N-(3-dimethylamino)propyl succinimide, dodecenyl-N-methyl succinimide, and dodecenyl-N-methyl succinimide.

Living polymers include anionically polymerized polymers. Anionically-polymerized living polymers are formed by reacting anionic initiators with certain unsaturated monomers to propagate a polymeric structure. Throughout formation and propagation of the polymer, the polymeric structure is anionic and "living." A new batch of monomer subsequently added to the reaction can add to the living ends of the existing chains and increase the degree of polymerization. A living polymer, therefore, is a polymeric segment having a living or reactive end. Anionic polymerization is further described in George Odian, *Principles of Polymerization*, ch. 5 ($3^{rd}$ Ed. 1991), or Panek 94 J. Am. Chem. Soc., 8768 (1972), which are incorporated herein by reference.

Monomers that can be employed in preparing an anionically polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

Any anionic initiator can be employed to initiate the formation and propagation of the living polymers. Exemplary anionic initiators include, but are not limited to, alkyl lithium initiators such as n-butyl lithium, arenyllithium initiators, arenylsodium initiators, N-lithium dihydro-carbon amides, aminoalkyllithiums, and alkyl tin lithiums. Other useful initiators include N-lithiohexamethyleneimide, N-lithiopyrrolidinide, and N-lithiododecamethyleneimide as well as organolithium compounds such as the tri-alkyl lithium adducts of substituted aldimines and substituted ketimines, and N-lithio salts of substituted secondary amines. Exemplary initiators are also described in the following U.S. Pat. Nos. 5,332,810, 5,329,005, 5,578,542, 5,393,721, 5,698,646, 5,491,230, 5,521,309, 5,496,940, 5,574,109, and 5,786,441, which are incorporated herein by reference.

The amount of initiator employed in conducting anionic polymerizations can vary widely based upon the desired polymer characteristics. In one embodiment, it is preferred to employ from about 0.1 to about 100, and more preferably from about 0.33 to about 10 mmol of lithium per 100 g of monomer.

Anionic polymerizations are typically conducted in a polar solvent such as tetrahydrofuran (THF) or a nonpolar hydrocarbon such as the various cyclic and acyclic hexanes, heptanes, octanes, pentanes, their alkylated derivatives, and mixtures thereof, as well as benzene.

In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TIMEDA); linear THF oligomers; and the like. Specific examples of compounds useful as polar coordinators include tetrahydrofuran (THF), linear and cyclic oligomeric oxolanyl alkanes such as 2,2-bis (2'-tetrahydrofuryl) propane, di-piperidyl ethane, dipiperidyl methane, hexamethylphosphoramide, N—N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, incorporated herein by reference.

Anionically polymerized living polymers can be prepared by either batch or continuous methods. A batch polymerization is begun by charging a blend of monomer(s) and normal alkane solvent to a suitable reaction vessel, followed by the addition of the polar coordinator (if employed) and an initiator compound. The reactants are heated to a temperature of from about 20 to about 130° C. and the polymerization is allowed to proceed for from about 0.1 to about 24 hours. This reaction produces a reactive polymer having a reactive or living end. Preferably, at least about 30% of the polymer molecules contain a living end. More preferably, at least about 50% of the polymer molecules contain a living end. Even more preferably, at least about 80% contain a living end.

As noted above, the functionalizing agent is reacted with the living polymer end. This reaction can be achieved by simply mixing the functionalizing agent with the living polymer. In a preferred embodiment, the functionalizing agent is added once a peak polymerization temperature, which is indicative of nearly complete monomer conversion, is observed. Because live ends may self-terminate, it is especially preferred to add the functionalizing agent within about 25 to 35 minutes of the peak polymerization temperature.

The amount of functionalizing agent employed to prepare the functionalized polymers is best described with the understanding that the equivalents of lithium or metal cation within the initiator is greater than that in the carbon-lithium associated with living polymer. Accordingly, where a lithium initiator is employed, the ratio of equivalents of functionalizing agent to equivalents of carbon-lithium associated with living polymer, is preferably about 0.75:1, more preferably about 0.85:1, even more preferably about 0.95:1, and most preferably at least about 1:1.

In certain embodiments of this invention, the functionalizing agent can be employed in combination with other coupling or terminating agents. The combination of functionalizing agent with other terminating agent or coupling agent can be in any molar ratio. The coupling agents that can be employed in combination with the functionalizing agent include any of those coupling agents known in the art including, but not limited to, tin tetrachloride, tetraethyl ortho silicate, and tetraethoxy tin, and silicon tetrachloride. Likewise, any terminating agent can be employed in combination with the functionalizing agent including, but not limited to, tributyltin chloride. In one embodiment, the living polymer can be treated with a molar equivalent of triisobutyl aluminum prior to reacting with the terminating agent.

After formation of the functional polymer, a processing aid and other optional additives such as oil can be added to the polymer cement. The functional polymer and other optional ingredients are then isolated from the solvent and preferably dried. Conventional procedures for desolventization and drying may be employed. In one embodiment, the functional polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

After formation of the functional polymer, a processing aid and other optional additives such as oil can be added to the polymer cement. The functional polymer and other optional ingredients are then isolated from the solvent and preferably dried. Conventional procedures for desolventization and drying may be employed. In one embodiment, the functional polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

In certain embodiments, where a living polymer bearing a cyclic amine head group (i.e., where α of the functionalized polymer of Formula VI includes a cyclic amine) is terminated with an anhydride terminating agent, the functionalized polymer has demonstrated unexpectedly advantageous characteristics for use in tire tread compositions. Particularly, these functionalized polymers show unexpectedly high increase in interaction with filler particles as indicated by a reduction in tan δ and an increase in bound rubber. Without wishing to be bound by any particular theory, it is believed that the cyclic amine head group and tail group resulting from termination with an anhydride compound has some synergistic effect that results in an increased interaction with filler particles.

The functionalized polymers of this invention are particularly useful in preparing tire components. These tire components can be prepared by using the functionalized polymers of this invention alone or together with other rubbery polymers. Other rubbery elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers may include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in *Kirk-Othmer, Encyclopedia of Chemical Technology*, 365-468, (3$^{rd}$ Ed. 1982), particularly *Vulcanization Agents and Auxiliary Materials*, 390-402, and A. Y. Coran, *Vulcanization in Encyclopedia of Polymer Science and Engineering*, (2$^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These stocks are useful for forming tire components such as treads, subtreads, black sidewalls, body ply skins, bead filler, and the like. Preferably, the functional polymers are employed in tread formulations, and these tread formulations will include from about 10 to about 100% by weight of the functional polymer based on the total rubber within the formulation. More preferably, the tread formulation will include from about 35 to about 90% by weight, and more preferably from about 50 to 80% by weight of the functional polymer based on the total weight of the rubber within the formulation. The preparation of vulcanizable compositions and the construction and curing of the tire is not affected by the practice of this invention.

Preferably, the vulcanizable rubber composition is prepared by forming an initial masterbatch that includes the rubber component and filler. This initial masterbatch is mixed at a starting temperature of from about 25° C. to about 125° C. with a discharge temperature of about 135° C. to about 180° C. To prevent premature vulcanization (also known as scorch), this initial masterbatch generally excludes any vulcanizing agents. Once the initial masterbatch is processed, the vulcanizing agents are introduced and blended into the initial masterbatch at low temperatures in a final mix stage, which does not initiate the vulcanization process. Optionally, additional mixing stages, sometimes called remills, can be employed between the masterbatch mix stage and the final mix stage. Rubber compounding techniques and the additives employed therein are generally known as disclosed in Stephens, *The Compounding and Vulcanization of Rubber*, in *Rubber Technology* (2$^{nd}$ Ed. 1973). The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it is heated to about 140 to about 180° C. Cured or crosslinked rubber compositions may be referred to as vulcanizates, which generally contain three-dimensional polymeric networks that are thermoset. The other ingredients, such as processing aides and fillers, are generally evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Experiment 1

An imine terminating agent was prepared by reacting dodecenyl succinic anhydride with 3-dimethylpropylamine. Specifically, a 1:1 molar ratio of the anhydride and amine were contacted in cyclohexane and the water of reaction was removed by distillation of the water/cyclohexane azeotrope.

Experiment 2

Three separate polymer cements were prepared by employing similar procedures except that the first cement was synthesized by using n-butyllithium (NBL) as an initiator, the second cement was synthesized by using tributyltin lithium (TBTL) as an initiator, and the third cement was synthesized by using lithiohexamethyleneimine (LHMI) as an initiator. Specifically, these cements were prepared in 2-gallon reactors that were initially charged with 1,800 g of dried technical hexanes, 455 g of a 33% solution of a styrene/hexane blend, and 2,740 g of a 20.5% 1,3-butadiene/hexane blend. A polar randomizer (about 0.33 equivalents per equivalent of lithium) and the initiator (about 0.91 equivalents of lithium per 100 g of monomer) were subsequently charged. The reactor was heated in batch mode to about 48° C., and an exotherm of about 55° C. was observed within about 6 minutes. Following this exotherm, the reaction mixtures were continuously stirred for an additional 60 minutes and the resulting cement was apportioned to dried, nitrogen purged, and ultimately capped bottles for subsequent termination reactions. Specifically, samples of each polymer cement were terminated by using (in separate bottles) (i) isopropyl alcohol (IPA) or (ii) the imide prepared in Experiment 1 (imide). Where the isopropyl alcohol was employed, an excess was used to terminate and then subsequently coagulate the polymer. Where the imide was employed, 1 equivalent of the imide per equivalent of lithium was added to the polymer cement, the cement was then agitated for about 30 minutes at 50° C., and the functionalized polymer was then coagulated in alcohol and drum dried. Table I sets forth six examples that were prepared and the characteristics of each of the functionalized polymers.

TABLE I

| Sample | Initiator | Termina-tor | % Gel | $ML_{1+4}$ @ 100° C. | $t_{80}$ | Mn (g/mole) | Mw/Mn |
|---|---|---|---|---|---|---|---|
| 1 | NBL | IPA | 3.0 | 15.0 | 2.3 | 124.227 | 1.13 |
| 2 | NBL | IMIDE | 1.5 | 18.5 | 2.3 | 106.109 | 1.27 |
| 3 | TBTL | IPA | 2.0 | 6.1 | 3.3 | 108.160 | 1.06 |
| 4 | TBTL | IMIDE | 0.5 | 8.6 | 3.7 | 96.565 | 1.11 |
| 5 | LHMI | IPA | 0.5 | 12.2 | 4.0 | 124.518 | 1.06 |
| 6 | LHMI | IMIDE | 0.5 | 13.2 | 3.7 | 108.224 | 1.10 |

Experiment 3

The functionalized polymers prepared above (Samples 1-6) were each employed to prepare separate tire formulations that included either a carbon black reinforcement or a silica and carbon black blend reinforcement. The recipes for the tire formulations are set forth in Table II.

TABLE II

| Ingredient | Carbon Black Formulation (phr) | Silica Formulation (phr) |
|---|---|---|
| Functionalized Polymer | 100 | 100 |
| Carbon Black | 55 | 35 |
| Silica | — | 30 |
| Antiozonant | 0.95 | 0.95 |
| Zinc Oxide | 2.5 | 2.5 |
| Stearic Acid | 2 | 1.5 |
| Oil | 10 | 10 |
| Wax | 1 | 1.03 |
| Coupling Agent | — | 2.74 |
| Binder | — | 0.8 |
| Sulfur | 1.3 | 1.7 |
| Accelerator | 1.9 | 2.0 |
| Retarder | — | 0.25 |

The tire formulations were mixed using conventional mixing procedures. Namely, when preparing formulations that included carbon black reinforcement, the ingredients (excluding the sulfur and accelerators) were initially mixed at about 65-165° C. for 6 minutes, and the sulfur and accelerators were subsequently added in a separate mixing step that was conducted at about 65-105° C. for 2 minutes. On the other hand, where the formulations included both carbon black and silica, the ingredients (excluding sulfur, accelerators, binder, coupling agents, and wax) were mixed at about 65-165° C. for 6 minutes, the coupling agent was subsequently added and mixed at about 65-140° C. for 3 minutes, and the sulfur, accelerators, and wax were added in a final mixing step and mixed at about 65-105° C. for 2 minutes.

The formulations were then prepared into test specimens and cured within a closed cavity mold under pressure for 15 minutes at 171° C. The test specimens were then subjected to various physical tests, and the results of these tests are reported in Table III for formulations that exclusively included carbon black as a reinforcement and in Table IV for formulations that included a carbon black/silica blend. The polymer number provided in each table corresponds to the polymer prepared in Experiment 2 (i.e., polymer 1A corresponds to Sample 1). Each formation is labeled alphanumerically (i.e., formulations A-F).

TABLE III

| | Formulation | | | | | |
|---|---|---|---|---|---|---|
| | A | B | C | D | E | F |
| | Polymer | | | | | |
| Property | 1 | 2 | 3 | 4 | 5 | 6 |
| 300% Modulus @ 23° C. (MPa) | 11.19 | 12.03 | 13.76 | 15.25 | 13.80 | 14.94 |
| Tensile Strength @ 23° C. (MPa) | 18.06 | 18.19 | 17.85 | 17.97 | 19.26 | 18.64 |
| tan δ @ 0° C. (temp sweep) | 0.2262 | 0.2337 | 0.2226 | 0.2322 | 0.2291 | 0.2377 |
| tan δ @ 50° C. (temp sweep) | 0.2538 | 0.2296 | 0.2140 | 0.1918 | 0.2011 | 0.2051 |
| Δ G' (MPa) | 4.6737 | 3.2513 | 0.9305 | 0.7569 | 1.2120 | 1.2553 |
| tan δ @ 50° C. (strain sweep) | 0.2559 | 0.2221 | 0.1394 | 0.1213 | 0.1393 | 0.1315 |
| Bound Rubber (%) | 14.7 | 21.7 | 39.0 | 42.5 | 33.5 | 32.5 |
| Dynastat tan δ @ 50° C. | — | — | 0.1430 | 0.1312 | 0.1420 | 0.1469 |

TABLE IV

| | Formulation | | | | | |
|---|---|---|---|---|---|---|
| | G | H | I | J | K | L |
| | Polymer | | | | | |
| Property | 1 | 2 | 3 | 4 | 5 | 6 |
| 300% Modulus @ 23° C. (MPa) | 9.6 | 10.8 | 9.9 | 11.7 | 11.7 | 12.3 |
| Tensile Strength @ 23° C. (MPa) | 13.2 | 16.5 | 14.4 | 17.1 | 14.9 | 17.0 |
| tan δ @ 0° C. (temp sweep) | 0.2047 | 0.2150 | 0.2135 | 0.2214 | 0.2137 | 0.2250 |
| tan δ @ 50° C. (temp sweep) | 0.2519 | 0.2094 | 0.2116 | 0.1756 | 0.2117 | 0.1842 |
| Δ G' (MPa) | 7.388 | 4.042 | 4.264 | 1.667 | 3.949 | 3.446 |
| tan δ @ 50° C. (strain sweep) | 0.2399 | 0.1944 | 0.1994 | 0.1331 | 0.1823 | 0.1356 |
| Bound Rubber (%) | 24.2 | 29.1 | — | — | — | — |
| Dynastat tan δ @ 50° C. | — | — | 0.1969 | 0.1279 | 0.1762 | 0.1343 |

Mooney viscosity measurement was conducted at 100° C. using a large rotor. The Mooney viscosity was recorded as the torque when the rotor has rotated for 4 minutes. The sample is preheated at 100° C. for 1 minute before the rotor starts.

The bound rubber content test was used to determine the percent of polymer bound to filler particles in rubber stocks. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Polymer} = \frac{100(Wd - F)}{R} \quad (1)$$

where Wd is the weight of dried gel, F is the weight of filler in gel or solvent insoluble matter (same as weight of filler in original sample), and R is the weight of polymer in original sample.

The tensile mechanical properties were measured using the standard procedure described in the ASTM-D 412 at 25° C. and 100° C. The tensile test specimens had dumbbell shapes with a thickness of 1.9 mm. A specific gauge length of 25.4 mm is used for the tensile test. Heat aged data was obtained after heating the vulcanizates for 24 hours at 100° C.

The tear strengths of the rubbers measured at a temperature of 100° C. along with the elongation at break ($E_b$) data are listed in Table 12. The tear strengths of the vulcanized stocks were measured using the procedure following the ASTM-D 624 at 100° C. Test specimens were nicked round rings with a dimension of 6.3 mm in width, 2.5 mm in thickness, and 44 mm and 57.5 mm in inside and outside diameters. The specimen was tested at the specific gauge length of 44.45 mm.

Temperature sweep experiments were conducted with a frequency of 31.4 rad/sec using 0.5% strain for temperature ranging from −100° C. to −10° C., and 2% strain for the temperature ranging from −10° C. to 100° C. Payne effect (ΔG') data were obtained from the strain sweep experiment. A frequency of 3.14 rad/sec was used for strain sweep which is conducted at 65° C. with strain sweeping from 0.25% to 14.75%.

Experiment 4

Additional polymer cements were prepared in a similar fashion to those in Experiment 2 and terminated with either isopropyl alcohol (IPA), dodecenyl succinic anhydride (DSA), or a combination of isopropyl alcohol and dodecenyl succinic anhydride. Those polymers terminated with isopropyl alcohol and dodecenyl succinic anhydride were treated first with 0.5 equivalent of the anhydride and then second with 0.5 equivalent of the alcohol per equivalent of lithium. The polymer cement that was employed to ultimately prepare Samples 7-11 were initiated with lithiohexamethyleneimine. The cement that was employed to prepare Sample 11 was initiated with 0.15 equivalent of n-butyllithium and 0.85 equivalent of lithiohexamethyleneimine. The cement that was employed to prepare Samples 12-16 was initiated with n-butyllithium. The characteristics of the resulting polymers are set forth in Table V.

TABLE V

| Sample | Initiator | Terminator | % Gel | $ML_{1+4}$@100° C. | $t_{80}$ | Mn (g/mole) | Mw/Mn |
|---|---|---|---|---|---|---|---|
| 10 | 19-1 LHMI | IPA | 2.5 | 9 | | 109.582 | 1.04 |
| 11 | 19-2 LHMI | IPA/DSA | 1.5 | 58.5 | | 167.715 | 1.17 |
| 12 | 19-3 LHMI | DSA | 2.5 | 62.9 | | 159.286 | 1.16 |
| 13 | 37-1 LHMI | IPA | 1 | 8.0 | | 100.528 | 1.06 |
| 14 | 39-1 LHMI/NBL | IPA | 1.0 | 9.3 | | 106.680 | 1.06 |
| 15 | 43-1 NBL | IPA | 1.5 | 9.8 | | 117.974 | 1.08 |
| 16 | 17-1 NBL | IPA | 2.0 | 9.3 | | 108.948 | 1.05 |
| 17 | 17-2 NBL | IPA/DSA | 1.5 | 53.3 | | 171.270 | 1.19 |
| 18 | 17-3 NBL | DSA | 2.0 | 62.9 | | 166.488 | 1.16 |
| 19 | 45-1 NBL | IPA | — | 7.2 | | 113.577 | 1.06 |

Experiment 5

In a similar fashion to Experiment 3, the various polymers were employed to prepare tire formulations. The recipes for the tire formulations were similar to those set forth in Table II. The results of tests performed on cured samples of these tire formulations are set forth in Table VI, which includes formulations that exclusively included carbon black, and Table VII, which includes formulations that included a carbon black silica blend. As set forth above, the polymer number provided in each table corresponds to the polymer prepared in Experiment 4. Each formulation is labeled alphanumerically.

TABLE VI

| | Formulations | | | | | | | | | |
|---|---|---|---|---|---|---|---|---|---|---|
| | M | N | O | P | Q | R | S | T | U | V |
| | Polymer | | | | | | | | | |
| Property | 10 | 11 | 12 | 13 | 14 | 15 | 16 | 17 | 18 | 19 |
| 300% Modulus @ 23° C. (MPa) | 14.1 | 15.9 | 17.7 | 11.0 | 13.2 | 10.6 | 12.2 | 14.4 | 14.2 | 11.3 |
| Tensile Strength @ 23° C. (MPa) | 15.9 | 16.5 | 20.2 | 16.2 | 18.1 | 15.1 | 15.8 | 16.7 | 17.2 | 16.5 |
| tan δ @ 0° C. (temp sweep) | 0.2716 | 0.3103 | 0.3054 | 0.2286 | 0.2484 | 0.2606 | 0.2342 | 0.2596 | 0.2520 | 0.2250 |
| tan δ @ 50° C. (temp sweep) | 0.2165 | 0.1523 | 0.1604 | 0.2103 | 0.2180 | 0.2656 | 0.2732 | 0.2379 | 0.2414 | 0.2549 |
| Δ G' (MPa) | 1.3764 | 0.2658 | 1.3289 | 1.5746 | 1.3921 | 4.9548 | 5.5585 | 3.2547 | 2.9852 | 4.5121 |
| tan δ @ 50° C. (strain sweep) | 0.1466 | 0.1236 | 0.1243 | 0.1564 | 0.1538 | 0.2577 | 0.2805 | 0.2015 | 0.1948 | 0.2562 |
| Bound Rubber (%) | 33.7 | 49.4 | 36.6 | 34.5 | 32.1 | 13.8 | 14.2 | 23.6 | 23.3 | 13.3 |

TABLE VII

| | Formulation | | | | | | | | | |
|---|---|---|---|---|---|---|---|---|---|---|
| | W | X | Y | Z | AA | BB | CC | DD | EE | FF |
| | Polymer | | | | | | | | | |
| Property | 10 | 11 | 12 | 13 | 14 | 15 | 16 | 17 | 18 | 19 |
| 300% Modulus @ 23° C. (MPa) | 11.8 | 14.5 | 15.0 | 11.8 | 11.9 | 7.7 | 9.2 | 12.0 | 12.1 | 7.7 |
| Tensile Strength @ 23° C. (MPa) | 14.1 | 18.2 | 15.7 | 14.8 | 15.6 | 11.9 | 11.0 | 16.2 | 14.1 | 11.9 |
| tan δ @ 0° C. (temp sweep) | 0.2187 | 0.2257 | 0.2306 | 0.1992 | 0.2043 | 0.221 | 0.2169 | 0.2223 | 0.2203 | 0.2122 |
| tan δ @ 50° C. (temp sweep) | 0.2148 | 0.1827 | 0.1806 | 0.2135 | 0.2141 | 0.2470 | 0.2527 | 0.2158 | 0.2145 | 0.2461 |
| Δ G' (MPa) | 3.045 | 2.961 | 3.336 | 4.645 | 4.216 | 7.407 | 7.036 | 5.158 | 4.771 | 6.479 |
| tan δ @ 50° C. (strain sweep) | 0.1787 | 0.1409 | 0.1475 | 0.2180 | 0.1964 | 0.2460 | 0.2411 | 0.2043 | 0.1866 | 0.2459 |
| Bound Rubber (%) | 33.5 | 42.7 | 38.6 | 30.4 | 31.2 | 21.2 | 23.8 | 30.7 | 29.6 | 20.3 |
| Dynastat tan δ @ 50° C. | | | | | | | | | | |

Various modifications and alterations that do not depart from the scope and spirit of this invention will become apparent to those skilled in the art. This invention is not to be duly limited to the illustrative embodiments set forth herein.

What is claimed is:

1. A functionalized polymer defined by the formula

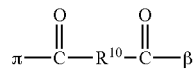

where π is a polymer chain selected from the group consisting of polybutadiene, polyisoprene, poly(styrene-co-butadiene), poly(styrene-co-butadiene-co-isoprene), poly(isoprene-co-styrene), and poly(butadiene-co-isoprene), $R^{10}$ is a divalent organic group, and β is a hydroxyl group, an alkoxyl group, or an amine group, where the amine group is represented by the formula —$NR_2$, where at least one R is a monovalent organic group and where the second R is hydrogen or a monovalent organic group, and where the alkoxyl group is represented by the formula —OR', where R' is a monovalent organic group.

2. The functionalized polymer of claim 1, where $R^{10}$ is a substituted ethylene group defined by the formula

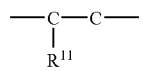

where $R^{11}$ is a monovalent organic group.

3. The functionalized polymer of claim 1, where the functionalized polymer is defined by the formula

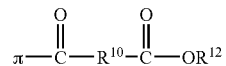

where $R^{12}$ is a monovalent organic group or a hydrogen atom.

4. The functionalized polymer of claim 1, where the functionalized polymer is defined by the formula

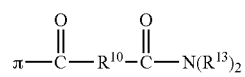

where at least one $R^{13}$ is a monovalent organic group, and where the second $R^{13}$ is hydrogen or a monovalent organic group.

5. The functionalized polymer of claim 1, where the functionalized polymer is defined by the formula

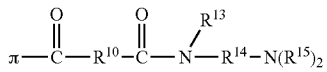

where $R^{13}$ is a hydrogen atom or a monovalent organic group, $R^{14}$ is a divalent organic group, and each $R^{15}$ is independently hydrogen or a monovalent organic group.

6. The functionalized polymer of claim 1, where the functionalized polymer is defined by the formula

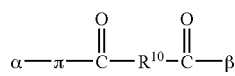

where α is a functionality or functional group that reacts or interacts with rubber or rubber fillers.

7. The functionalized polymer of claim 6, where α is a cyclic amine defined by the formula

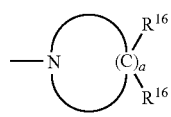

where each $R^{16}$ is independently hydrogen or a hydrocarbyl group, or where two $R^{16}$ join together to form a hydrocarbylene group, which results in a bicyclic compound, and where a is an integer from 4 to about 18.

8. The functionalized polymer of claim 7, where β is a hydroxyl or alkoxyl group.

9. A tire component comprising the vulcanized residue of the functionalized polymer of claim 1.

10. The tire component of claim 9, where the tire component is a tire tread.

11. The functionalized polymer of claim 6, where the functionalized polymer is defined by the formula

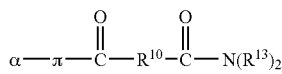

where at least one $R^{13}$ is a monovalent organic group, and where the second $R^{13}$ is hydrogen or a monovalent organic group.

12. The functionalized polymer of claim 11, where the functionalized polymer is defined by the formula

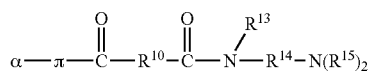

where $R^{13}$ is a hydrogen atom or a monovalent organic group, $R^{14}$ is a divalent organic group, and each $R^{15}$ is independently hydrogen or a monovalent organic group.

13. The functionalized polymer of claim 12, where α is a cyclic amine defined by the formula

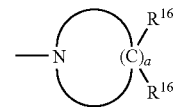

where each $R^{16}$ is independently hydrogen or a hydrocarbyl group, or where two $R^{16}$ join together to form a hydrocarbylene group, which results in a bicyclic compound, and where a is an integer from 4 to about 18.

14. The functionalized polymer of claim 13, where the polymer chain π is an anionically polymerized polymer.

15. The functionalized polymer of claim 12, where α is a trialkyltin substituent.

16. The functionalized polymer of claim 12, where α is a thioacetal.

17. A functionalized polymer defined by the formula

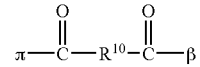

where π is a polymer chain where the polymer chain π is an anionically polymerized polymer, $R^{10}$ is a divalent organic group, and β is a hydroxyl group, an alkoxyl group, or an amine group, where the amine group is represented by the formula —$NR_2$, where at least one R is a monovalent organic group and where the second R is hydrogen or a monovalent organic group, and where the alkoxyl group is represented by the formula —OR', where R' is a monovalent organic group.

18. The functionalized polymer of claim 17, where the polymer chain π has a glass transition temperature ($T_g$) less than 0° C. and the number average molecular weight is from about 5 to about 1,000 kg/mole.

19. The functionalized polymer of claim 17, where the polymer chain π is selected from the group consisting of polybutadiene, polyisoprene, poly(styrene-co-butadiene), poly(styrene-co-butadiene-co-isoprene), poly(isoprene-co-styrene), and poly(butadiene-co-isoprene).

20. The functionalized polymer of claim 1, where the polymer chain π has a glass transition temperature ($T_g$) less than 0° C. and the number average molecular weight is from about 5 to about 1,000 kg/mole.

21. A functionalized polymer defined by the formula

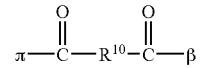

where π is a polymer chain, and β is a hydroxyl group, an alkoxyl group, or an amine group, where the amine group is represented by the formula —$NR_2$, where at least one R is a monovalent organic group and where the second R is hydrogen or a monovalent organic group, and where the alkoxyl group is represented by the formula —OR', where R' is a monovalent organic group, where $R^{10}$ is a substituted ethylene group defined by the formula

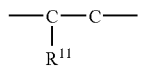

where $R^{11}$ is a monovalent organic group.

22. The functionalized polymer of claim 21, where the functionalized polymer is defined by the formula

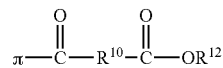

where $R^{12}$ is a monovalent organic group or a hydrogen atom.

23. The functionalized polymer of claim 21, where the functionalized polymer is defined by the formula

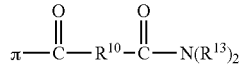

where at least one $R^{13}$ is a monovalent organic group, and where the second $R^{13}$ is hydrogen or a monovalent organic group.

24. The functionalized polymer of claim 21, where the functionalized polymer is defined by the formula

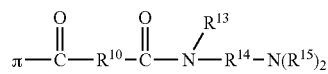

where $R^{13}$ is a hydrogen atom or a monovalent organic group, $R^{14}$ is a divalent organic group, and each $R^{15}$ is independently hydrogen or a monovalent organic group.

25. The functionalized polymer of claim 21, where the functionalized polymer is defined by the formula

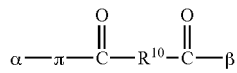

where α is a functionality or functional group that reacts or interacts with rubber or rubber fillers, π is a polymer chain, and β a hydroxyl, alkoxyl, or amine group as defined above.

* * * * *